United States Patent [19]

Fleischer

[11] Patent Number: 5,069,115
[45] Date of Patent: Dec. 3, 1991

[54] EXHAUST-GAS REMOVAL DUCT FORMED FROM INDIVIDUAL AXIALLY MUTUALLY ADJACENT SECTIONS FOR TRACK-FORMING LANES

[75] Inventor: Horst Fleischer, Weinstadt, Fed. Rep. of Germany

[73] Assignee: Daimler-Benz AG, Fed. Rep. of Germany

[21] Appl. No.: 553,618

[22] Filed: Jul. 18, 1990

[30] Foreign Application Priority Data

Jul. 22, 1989 [DE] Fed. Rep. of Germany ....... 3924294

[51] Int. Cl.⁵ .................................................. E21F 1/04
[52] U.S. Cl. ...................................... 454/166; 454/64
[58] Field of Search .......................... 98/49, 115.4, 1; 110/184, 162; 285/185, 226

[56] References Cited

U.S. PATENT DOCUMENTS

| 704,808 | 7/1902 | Kress .................................. 98/49 |
| 4,567,817 | 2/1986 | Fleisher et al. ....................... 98/49 |

FOREIGN PATENT DOCUMENTS

| 3222830 | 12/1983 | Fed. Rep. of Germany .......... 98/49 |
| 3419369 | 4/1986 | Fed. Rep. of Germany . |
| 0047912 | 12/1979 | U.S.S.R. ............................. 98/115.4 |
| 1179037 | 9/1985 | U.S.S.R. ............................. 98/115.4 |
| 2172385 | 9/1986 | U.S.S.R. ................................. 98/49 |

Primary Examiner—Albert J. Makay
Assistant Examiner—William C. Doerrler
Attorney, Agent, or Firm—Evenson, Wands, Edwards, Lenahan & McKeown

[57] ABSTRACT

The invention relates to an exhaust-gas removal duct formed from individual axially mutually adjacent sections for track-forming lanes, having a longitudinal slot closed by a pair of elastic sealing lips. Each section has two channel-shaped shells which are joined leaktightly along a common longitudinal edge. One yoke sheet is, furthermore, provided per section, surrounds the section up to the longitudinal slot, transversely to the longitudinal axis of the removal duct, and is connected to the channel-shaped shells only in the region of the longitudinal edge and in the region of the sealing lips.

20 Claims, 2 Drawing Sheets 5,069,115

EXHAUST-GAS REMOVAL DUCT FORMED FROM INDIVIDUAL AXIALLY MUTUALLY ADJACENT SECTIONS FOR TRACK-FORMING LANES

BACKGROUND AND SUMMARY OF THE INVENTION

The invention relates to an exhaust-gas removal duct formed from individual axially mutually adjacent sections for track-forming lanes as is disclosed, for example, in German Patent Specification 3,419,369.

In German Patent Specification 3,419,369, a section of an exhaust-gas removal duct is shown which is enclosed at the circumference almost completely by a yoke sheet holding the section. The tubes have axial longitudinal slot which is closed to a large extent leaktightly by sealing lips. These sections are very unwieldy and bulky, as a result of which the storage space needed to house them is very large, as is the case, for example, when transporting the sections These factors contribute towards making the costs for building such an exhaust-gas removal duct, in particular inside a long tunnel, very high.

An object on which the invention is based is to develop an exhaust-gas removal duct of the generic type in such a manner that the building costs are reduced.

The object is achieved according to the invention by providing an arrangement wherein each section is formed from two channel-shaped shells, which are in each case joined to each other leaktightly at a common longitudinal edge and wherein the yoke sheet is connected to the channel-shaped shells only in the region of the longitudinal edges and in the region of the sealing lips. The channel-shaped sections provided with twin axial slots allow, on the one hand, a compact loading of a transport vehicle and of storage space, and, on the other hand, the weight which the worker has to lift for each part of a section is reduced.

Other objects, advantages and novel features of the present invention will become apparent from the following detailed description of the invention when considered in conjunction with the accompanying drawings.

DETAILED DESCRIPTION OF THE DRAWINGS

Figure 1:
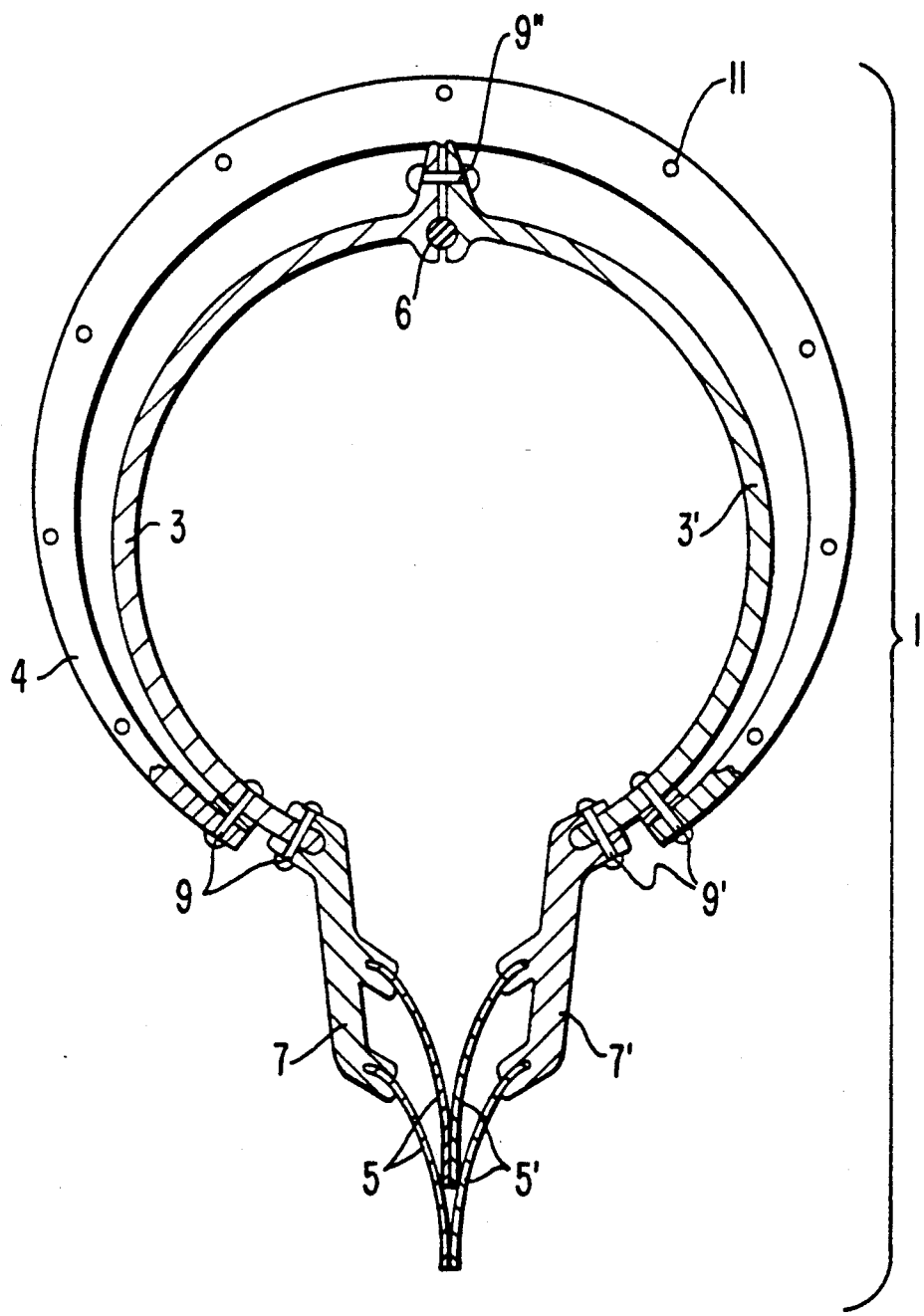
FIG. 1 shows a cross-section through a section of an exhaust-gas removal duct, constructed according to a preferred embodiment of the invention.

A cross section through a section of an exhaust-gas removal duct for track-forming lanes is shown in FIG. 1. The exhaust-gas removal duct is formed from several axially mutually adjacent sections 1 which are sealed circumferentially at their joints, for example by sleeves (not shown). The sections 1 have, on the lane side, a longitudinal slot which is closed leaktightly by means of two pairs of sealing lips 5, 5' which are arranged one behind the other in the direction of the lane in order to achieve a better sealing effect. The sealing lips 5,5' are inserted into lip holders 7, 7' which are placed over the longitudinal rims 8 of the longitudinal slot and are fastened to the latter by means of rivets, 9, 9'. Defective sealing lips 5, 5' or defective lip holders 7, 7' may thus be easily changed without the need for relatively large-scale and time-consuming repairs.

Figure 2:
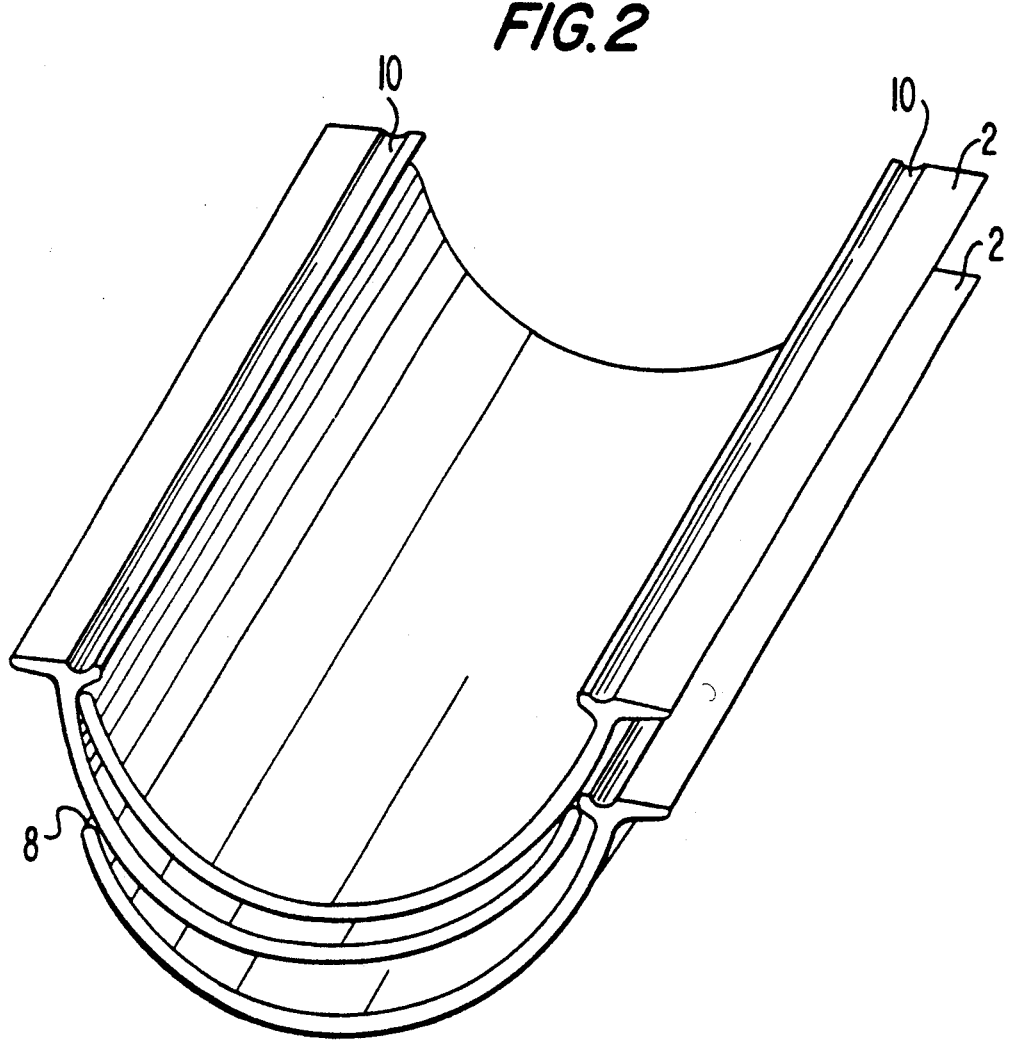
FIG. 2 shows a schematic stacking of the individual channel-shaped shells of the duct of FIG. 1.

Each section 1 has two channel-shaped shells 3, 3' which, when loose, can be arranged inside one another in a staggered manner, as shown in FIG. 2. At one of their rims—longitudinal edge 2—the two shells 3, 3' are joined together leaktightly and in this way form the casing of the cylindrical section 1.

A sealing material 6 is arranged between the surfaces facing each other of the longitudinal edges 2 of the shells 3, 3' in a groove 10 which is recessed into the surfaces facing each other and runs in the longitudinal direction of the section 1. The longitudinal edges 2 are connected by a rivet 9" which simultaneously presses the sealing material 6 into the grooves 10. So that the sealing material 6 and the rivet 9" arranged transverse to the longitudinal direction of the section 1 can be attached to the longitudinal edges 2, the surfaces of the longitudinal edges 2, assigned to one another measure approximately five times as wide as the wall thickness of the shells 3, 3'. The sealing material 6 must be temperature-resistant up to at least 120° C. since it will be subjected to, for example, the hot exhaust gases of the track-guided bus.

The riveted shells 3, 3' of each section 1 are surrounded by a ring-like yoke sheet 4 which is connected to the shells 3, 3' only in the region of the sealing lips, 5, 5' and in the region of the longitudinal edges 2. The yoke sheet 4 is connected to the shells 3, 3' in the region of the sealing lips 5, 5' by rivets 9, 9' and is clamped between the surfaces in the region of the longitudinal edges 2 by means of a lug acting in a pre-adjusting manner and projecting radially inwards from the yoke sheet 4. Axially running bores 11 provided with internal screw threads are arranged in the yoke sheet 4 and are provided for variable fastening of each individual section 1 of the exhaust-gas removal duct.

Figure 3:
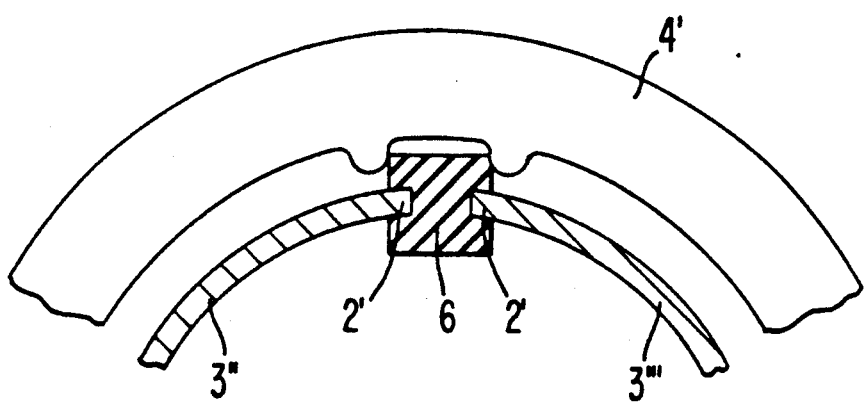
FIG. 3 shows a detail of a possible means for sealing the longitudinal edges.

Another possibility for sealing a common longitudinal edge 2' formed in a different manner is shown in FIG. 3 together with the consequent changes The surfaces of the longitudinal edges 2' which face each other in this exemplary embodiment measure the same width as the wall thickness of the shells 3", 3'". This is advantageous, in particular in terms of the production costs of the shells 3", 3'" as here only tubes, which are simple to produce, have to be provided with axial slots. So that the longitudinal edges 2' join each other leaktightly, the sealing material 6 has an H-shaped cross section. The two longitudinal edges 2' of the shells 3", 3'" are in each case inserted into the opening provided for them in the sealing material 6 until they abut the crosspiece of the sealing material. In the process, the sealing material 6 moulds itself leaktightly to the shells 3", 3'" in the region of the longitudinal edges 2'. So that the circumferential pre-adjustment is ensured, two radially inwardly projecting lugs are arranged here on the yoke sheet 4' which are spaced at a distance corresponding to the extent of the upper limb of the sealing material 6. The lugs then receive the upper limb of the sealing material 6 between them. Furthermore, the shells, 3", 3'" may in addition be connected to the yoke sheet 4' in the region of the longitudinal edges 2'. Connections may be made by means of screws, rivets, split pins, clamps or the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Exhaust-gas removal duct formed from individual axially mutually adjacent sections for track-forming lanes, having a longitudinal slot closed by a pair of elastic sealing lips, and at least one yoke sheet per section arranged transverse to the axis of the duct and surrounding the removal duct on the outer circumference up to the longitudinal slot, wherein each section is formed from two channel-shaped shells which are in each case joined to each other leaktightly at only one pair of common longitudinal edges, and wherein the yoke sheet is connected to the channel-shaped shells only in the region of the pair of common longitudinal edges and in the region of the sealing lips.

2. Exhaust-gas removal duct according to claim 1, wherein a sealing material, which is temperature-resistant up to at least 120° C., is arranged between the pair of common longitudinal edges.

3. Exhaust-gas removal duct according to claim 2, wherein the sealing material is placed over the common longitudinal edges of the channel-shaped shells.

4. Exhaust-gas removal duct according to claim 1, wherein the surfaces facing each other of the common longitudinal edges measure at least twice as wide as the wall thickness of the shells.

5. Exhaust-gas removal duct according to claim 4, wherein sealing material is arranged between the surfaces facing one another and is pressed together by them.

6. Exhaust-gas removal duct according to claim 1, wherein the sealing lips are inserted in, or attached to lip holders.

7. Exhaust-gas removal duct according to claim 6, wherein the lip holders are inserted in, or attached to lower longitudinal rims of the shells.

8. Exhaust-gas removal duct according to claim 7, wherein the sealing lips together with the lip holders and/or the lip holders are fastened in the region of the lower longitudinal rims of the shells by transversely extending pins in the form of nails, rivets, screws, split pins or the like.

9. Exhaust-gas removal duct according to claim 6, wherein a single lip holder has several sealing lips.

10. Exhaust-gas removal according to claim 3, wherein the surfaces facing each other of the common sealed longitudinal edges measure at least twice as wide as the wall thickness of the shells.

11. Exhaust-gas removal duct according to claim 5, wherein the sealing lips are inserted in, or attached to lip holders.

12. Exhaust-gas removal duct according to claim 7, wherein a single lip holder has several sealing lips.

13. Exhaust-gas removal duct according to claim 8, wherein a single lip holder has several sealing lips.

14. A method of making an exhaust-gas removal duct formed from individual axially mutually adjacent sections for track-forming lanes, having a longitudinal slot closed by a pair of elastic sealing lips, and at least one yoke sheet per section arranged transverse to the axis of the duct and surrounding the removal duct on the outer circumference up to the longitudinal slot, wherein each section is formed from two channel-shaped shells which are in each case joined to each other leaktightly at a common longitudinal edge, and wherein the yoke sheet is connected to the channel-shaped shells only in the region of the longitudinal edges and in the region of the sealing lips.

15. A method according to claim 14, wherein a sealing material, which is temperature-resistant up to at least 120° C., is arranged between the pair of common longitudinal edges.

16. A method according to claim 15, wherein the sealing material is placed over the common longitudinal edges of the channel-shaped shells.

17. A method according to claim 14, wherein the surfaces facing each other of the common longitudinal edges measure at least twice as wide as the wall thickness of the shells.

18. A method according to claim 17, wherein sealing material is arranged between the surfaces facing one another and is pressed together by them.

19. A method according to claim 14, wherein the sealing lips are inserted in, or attached to lip holders.

20. A method according to claim 19, wherein the lip holders are inserted in, or attached to lower longitudinal rims of the shells.

* * * * *